United States Patent

[11] 3,628,349

[72] Inventor Don P. Dixon
 4926 Space Center Drive, San Antonio, Tex. 78218
[21] Appl. No. 50,653
[22] Filed June 29, 1970
[45] Patented Dec. 21, 1971

[54] AUTOMOBILE AIR CONDITIONING SYSTEM
 3 Claims, 5 Drawing Figs.
[52] U.S. Cl. .................................................. 62/243,
 62/241, 62/244, 62/507
[51] Int. Cl. .................................................. B60h 3/04
[50] Field of Search ........................................... 62/243,
 244, 241

[56] References Cited
UNITED STATES PATENTS
3,381,492  5/1968  Dixon..........................  62/244

*Primary Examiner*—William J. Wye
*Attorney*—Hyer, Eickenroht, Thompson & Turner ABSTRACT: An air conditioning system for a "bug"-type Volkswagen automobile including a condenser assembly supported behind the spare tire compartment by means of bolts which extend into existing tapped holes in the front end of the automobile frame.

PATENTED DEC 21 1971 3,628,349

Don P. Dixon
INVENTOR

BY Dyer, Eickenroht,
Thompson & Turner
ATTORNEYS

Don P. Dixon
INVENTOR

BY Dyer, Eickenroht,
Thompson & Turner
ATTORNEYS

AUTOMOBILE AIR CONDITIONING SYSTEM

This invention relates to an air conditioning system for an automobile; and, more particularly, an improved system which is especially well suited for the "bug"-type Volkswagen automobile.

Conventional air conditioning systems are not suited to the compact construction of the Volkswagen automobile. That is, there is a very basic problem in finding room for the components of the system, at least without a major modification of the construction of the Volkswagen and/or the use of specially designed parts. With this in mind, it has been proposed to locate the condenser assembly of the system at the front end of the automobile, and particularly adjacent the undercarriage in a position to be cooled by outside air.

The design and installation of the assembly in this general area is not without its problems, both from the standpoint of limited space and inaccessability of the area. My prior U.S. Pat. No. 3,381,493 shows an air conditioning system for an automobile of this type having a condenser assembly which is nevertheless relatively easy to install in this space, with only a few modifications to the existing structure of the automobile.

An object of this invention is to provide a system in which the condenser assembly has these and other virtues.

A more particular object is to provide such an assembly which is supported from only one portion of the automobile, and preferably by means which uses existing parts thereof, thereby further simplifying its construction and installation.

In the drawings, wherein like reference characters are used throughout to designate like parts:

Figure 1:
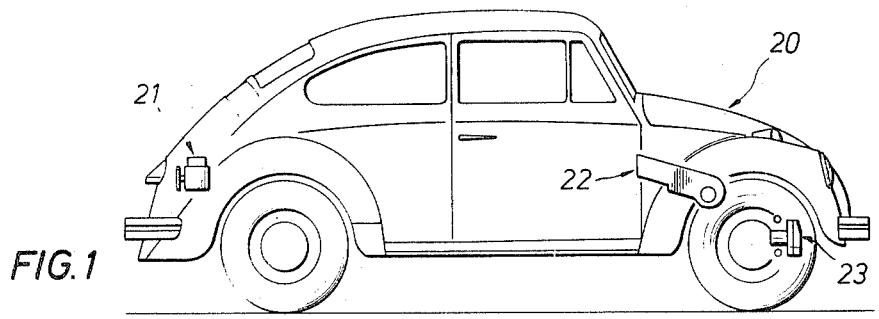
FIG. 1 is a side view of a "bug"-type Volkswagen automobile, with the condenser assembly, the evaporator, and the compressor of the air conditioning system superimposed thereon.

With reference now to the above-described drawings, and particularly FIG. 1, the Volkswagen automobile shown therein, and designated in its entirety by reference character 20, has its motor mounted in a compartment at the rear. Compressor 21 of the air conditioning system is shown in FIG. 1 in approximately the position it occupies within the motor compartment. As also indicated in FIG. 1, the evaporator 22 of the system is mounted within the passenger compartment beneath the dashboard, and the condenser assembly 23 is mounted in the forward portion of the automobile, as will be described in more detail to follow.

As well known in the art, these as well as other components of the air conditioning system are fluidly connected to one another for circulating a refrigerant therethrough and thereby cooling the interior of the automobile through outlets from the evaporator into the passenger compartment. Of course, power is transmitted from the crankshaft to the motor to the compressor 21, all in a manner to be described hereinafter.

Figure 2:
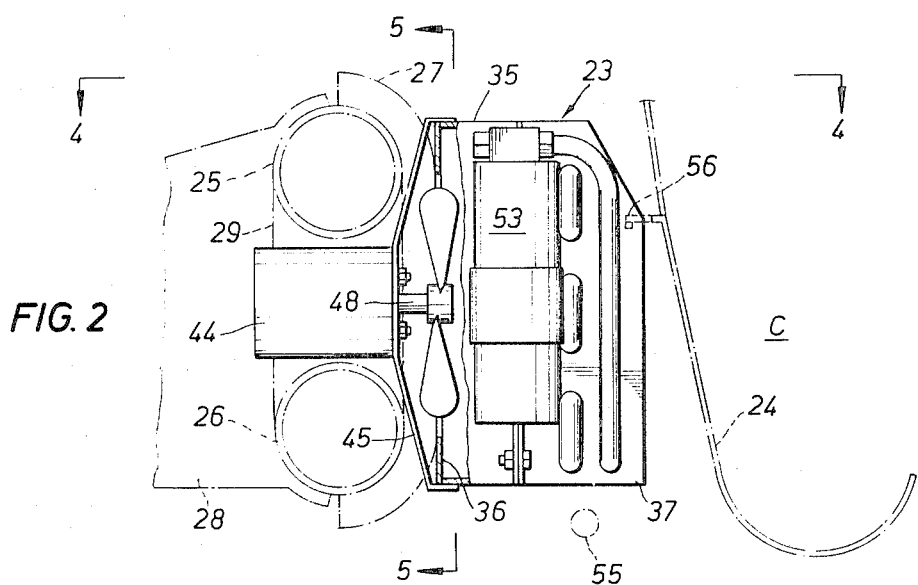
FIG. 2 is an enlarged vertical sectional view of the condenser assembly, with portions of the automobile shown in broken lines.

As shown by the broken lines in FIG. 2, a spare tire compartment C in the front end of the automobile has a rear wall 24 which extends downwardly and forwardly with respect to the automobile and is spaced forwardly of upper and lower axle beams 25 and 26, respectively. As shown in each of FIGS. 2 to 4, these beams have horizontally spaced-apart yokes 27 on their front sides, and a frame 28 having a front end 29 on the rear sides of the beams 25 and 26 is connected to the beams by means of bolts 30 which extend through the yokes and the beams into tapped holes in the front end of the frame.

There is a cover 32 on the front end 29 of the frame generally horizontally intermediate the yokes 27 and vertically intermediate the upper and lower beams 25 and 26. This cover is normally connected to the front end of the frame by means of bolts extending through holes 33 in the cover and into tapped holes 34 in the front end of the frame. As will be understood from the description to follow, these bolts are not shown inasmuch as they are removed and replaced by other bolts in the installation of the condenser assembly.

The condenser assembly 23 includes a shroud 35 having a rear wall 36 and open at the front, and a coil 37 mounted across the open front of the shroud. In accordance with the novel aspects of the present invention, the shroud, and thus the coil 37 and other parts of the condenser assembly 23 are supported from the front end 29 of the frame with the rear wall 36 of the shroud held tightly against the front sides of the yokes 27. As will be apparent from FIG. 2, the coil 37 is thus in position for air to pass through it and into the front of the shroud during forward movement of the automobile.

More particularly, the shroud is supported by means of bolts 38 which extend through holes 39 in the rear wall of the shroud and into the tapped holes 34 in the front end of the frame for the aforementioned bolts (not shown) which normally connect the cover 32 to the frame. As will be appreciated from FIG. 4, these bolts are rather long so as to bridge a gap between the rear wall 36 of the shroud and the front end for the frame. Nevertheless, upon make up of the bolts, the engagement of the rear wall of the shroud over the front sides of the yokes provides a firm support for the shroud and the other parts of the condenser assembly.

Figure 3:
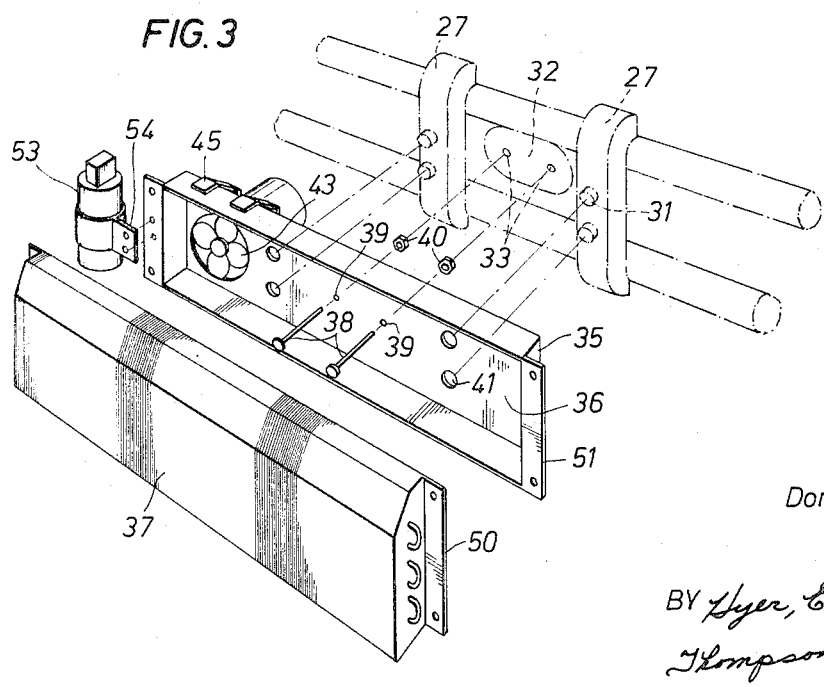
FIG. 3 is an exploded view of the parts of the condenser assembly.
Figure 4:
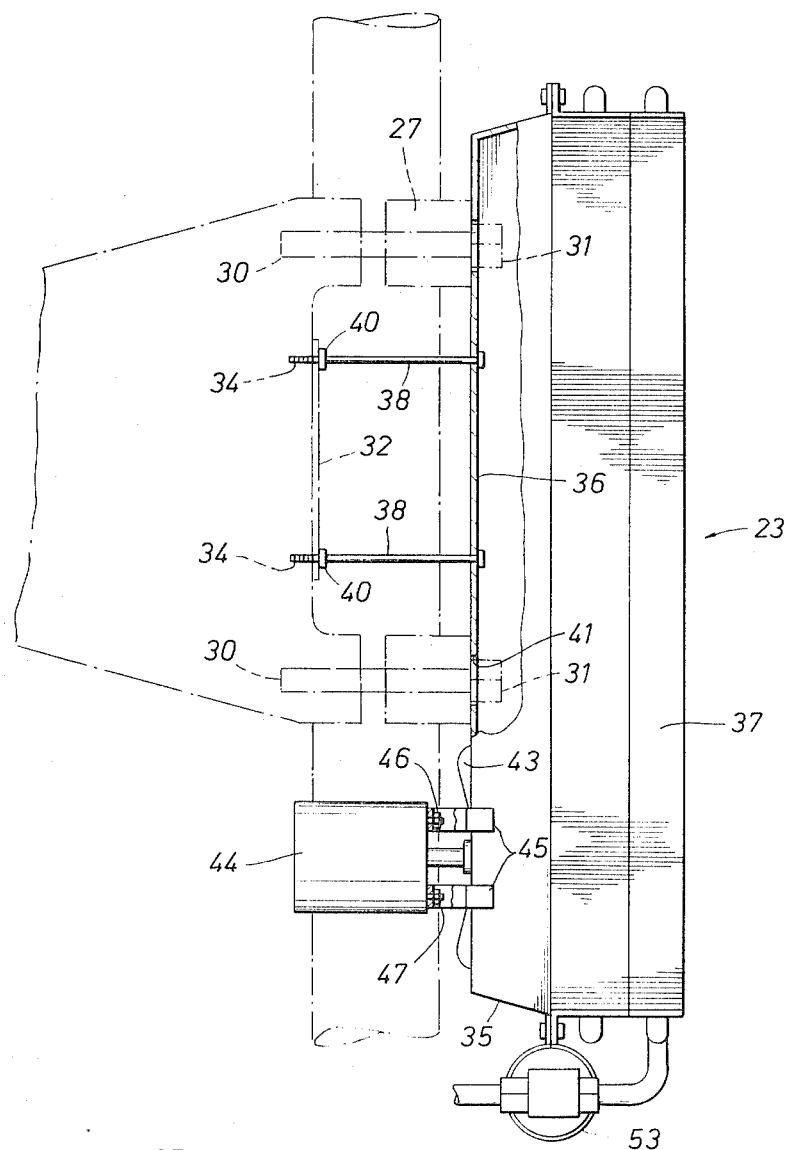
FIG. 4 is a top plan view of the assembly, as seen along broken line 4—4 of FIG. 2.
Figure 5:
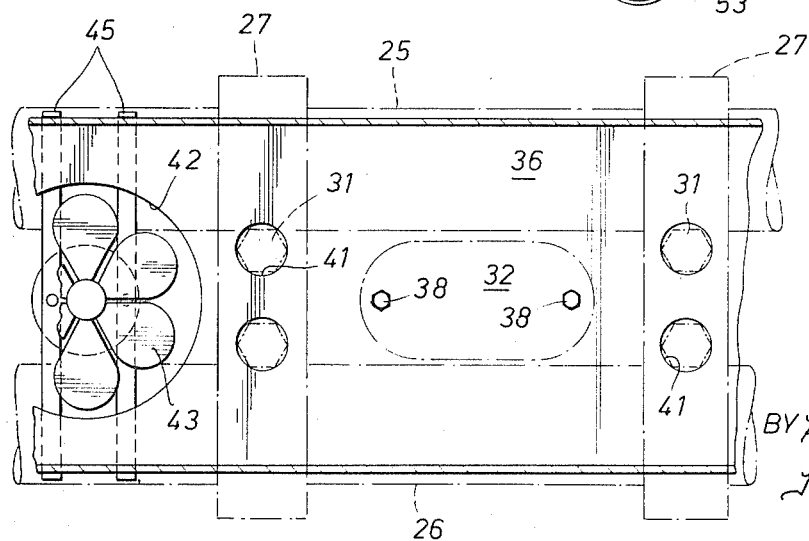
FIG. 5 is another vertical sectional view of a portion of the condenser assembly, as seen along broken line 5—5 of FIG. 2.

As will also be appreciated from FIG. 4, these bolts 38 also extend through the existing holes 33 in the cover 32, and nuts 40 are threaded over the bolts to permit them to be manipulated into positions holding the cover connected to the frame, as in the normal use of the automobile. As shown in FIGS. 3 and 5, there are additional holes 41 in the rear wall of the shroud to receive the heads 31 of the bolts 30.

There is also a hole 42 in the rear wall of the shroud toward one end thereof, and a fan 43 is rotatable within the hole for drawing air from the shroud. The fan is rotated by means of a drive shaft 48 on motor 44 which is mounted on the rear wall of the shroud by means of straps 45. When so mounted, the motor is disposed vertically between the axle beams 25 and 26 and horizontally on the outer side of one of the yokes 27.

As shown in FIG. 4, there are studs 46 which project forwardly from the front face of the motor and through holes in the straps 45 to permit the motor to be removably mounted on the straps 45 to permit the motor to be removably mounted on the straps by means of nuts 47.

The shroud has top and bottom and sidewalls which extend forwardly from the rear wall 36 to define the open front into the shroud. The coil 37 is of more or less conventional construction and has a flat rear side which is disposed across the open front of the shroud to define a space within the shroud between the rear side of the coil and the rear wall 36 of the shroud. The coil is mounted on the shroud by means of flanges 50 on the opposite sides of the coil adapted to be connected to flanges 51 on the opposite sides of the shroud. More particularly, these flanges are provided on the rear wall of the coil and front of the shroud so that they can be bolted to one another with their flanges abutting.

A receiver-dryer 53 is mounted on the side of the shroud and coil by means of a flange 54 which is disposed between adjacent flanges 50 and 51 and bolted thereto by bolts which extend through the flanges on the coil and shroud.

In preparation for installation of the above-described system, existing bolts are removed from tapped holes 33 to release cover 32 from the front of the frame. Also, a part of flange 56 on the rear wall 24 of the spare tire compartment is removed, as well be apparent from FIG. 2.

At this time, the shroud and cover 32 are moved into place and connected to the frame by means of the bolts 38 and nuts 40, as above described. The fan motor 44 is then moved into place behind the shroud and between the axle beam 25 and connected to the straps 45 on the shroud. Then, of course, the fan may be moved into place through the open front of the shroud and connected to the drive shaft 48 of the fan motor.

At this time, the condenser coil 37 is installed by moving it upwardly in a slightly tilted position between the rear wall 24 of the spare tire compartment C and a rod 55 which extends laterally between the wheels of the automobile. As previously described, a portion of flange 56 on the outer side of the rear wall 24 has been removed to make clearance for the front end of the coil as it is so moved and then connected to the shroud by bolting of the flanges 50 and 51 to one another. During this time, of course, the receiver-dryer 53 is also connected to the condenser assembly.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a Volkswagen automobile having a spare tire compartment, upper and lower front axle beams spaced behind said compartment and having horizontally spaced yokes on their front sides, a frame having a front end on the rear sides of the beams and connected thereto by bolts extending through said yokes, and a cover normally connected to the front end of the frame intermediate the beams and yokes by bolts extending through the cover into tapped holes in said front end; an air conditioning system having a condenser assembly, comprising a shroud having a rear wall and an open front, means supporting said shroud from the front end of the frame and with its rear wall against said yokes, including bolts which extend through said rear wall and said cover into said tapped holes, and a coil mounted across the open front of the shroud.

2. An air conditioning system of the character defined in claim 1, wherein the rear wall of the shroud has an opening therein, a fan is rotatable within the opening, and a motor for said fan is mounted on said rear wall and intermediate the beams and on the outer side of one of said yokes.

3. An air conditioning system of the character defined in claim 1, wherein the rear wall of the shroud has holes to receive the heads of the bolts which extend through the yokes.

* * * * *